Figure 1:
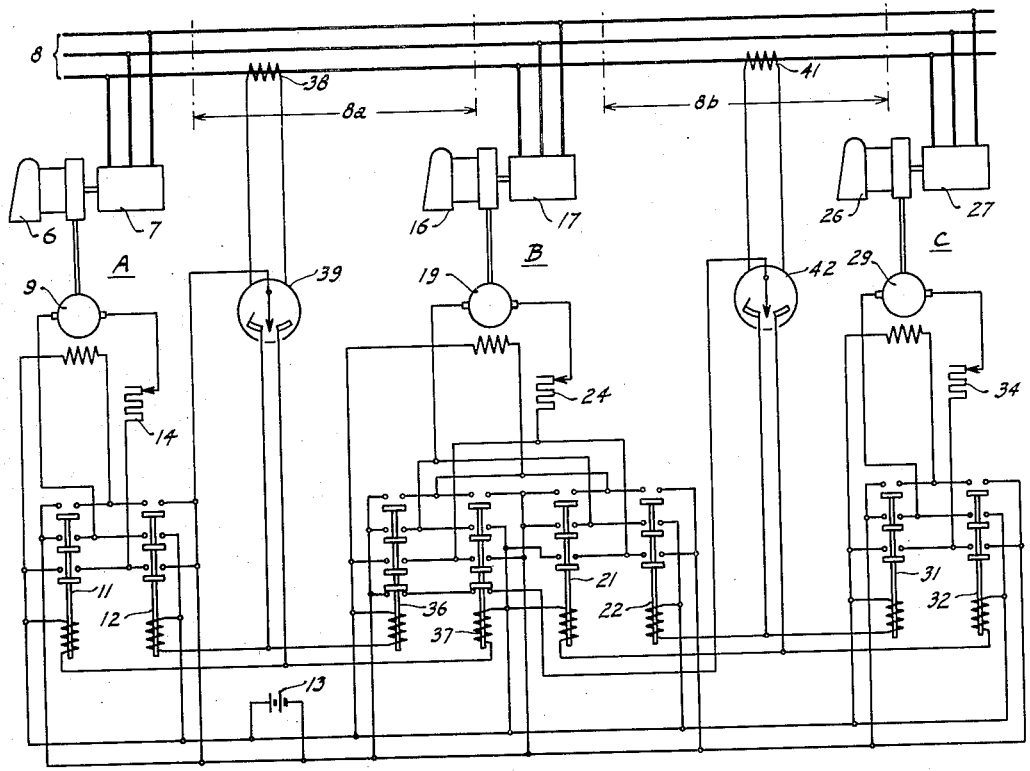

Dec. 18, 1934.  O. PLECHL  1,984,940

SYSTEM FOR REGULATING LOAD INTERCHANGE

Filed May 2, 1931

Inventor
Otto Plechl
By
Attorney

Patented Dec. 18, 1934

1,984,940

UNITED STATES PATENT OFFICE 1,984,940

SYSTEM FOR REGULATING LOAD INTERCHANGE

Otto Plechl, Pfaffstatten, near Vienna, Austria, assignor to Aktiengesellschaft Brown Boveri & Cie., Baden, Switzerland, a joint-stock company of Switzerland Application May 2, 1931, Serial No. 534,591
In Austria May 10, 1930

9 Claims. (Cl. 290—4)

This invention relates to improvements in systems for the automatic regulation of power interchanged between two or more power stations.

If a rapid change from the desired value takes place in the load interchanged between two power stations, a regulating system should automatically adjust the speed governor or the inlet valves for the prime movers in one station or the other until the variation in the load equilibrium from the predetermined value has disappeared. The known systems for remote regulation are subject to various difficulties and objections particularly if the total load on the two coupled electrical networks supplied by the stations is high in relation to the interchange load which is to be kept constant.

It is also frequently desired to maintain the interchange load constant or to regulate the same in such manner as to avoid influencing other networks connected with the two power stations interchanging load. It is found, however, that changing the load delivered by one of the stations also causes a change in the frequency of the electric power delivered by such stations and in all other portions of the system connected therewith. It was practically impossible, heretofore, to maintain an astatic speed regulation, i. e. an absolutely constant frequency, between several power stations in parallel operation. The frequency variations arising from each regulating action caused a variation not only in the interchange load but also caused a change in the total load on the network for the reason that, at each increase in the frequency, all of the motors connected to the network had to be momentarily accelerated and, after reaching the equilibrium condition, had to operate at a higher load in proportion to their increased speed.

If more than two power stations are connected with each other, the interchange load between the stations varies with each regulating operation in each of the stations even though the purpose of regulation is merely to maintain the load interchanged between two of such stations constant. The result of such a variation is that the regulating devices must vary the machine load not only by the amount required to regulate the load interchanged but must regulate by an amount different in each case because a change of the load on any point of the network indirectly disturbs the load interchange which is to be kept constant. In most cases the interchange load to be regulated is only a fraction of the total network load so that the regulation of the network is of greater amplitude than regulation of the load interchanged. As a result of the variations of the load on the network, a constant interchange between stations can be obtained only by a varying setting of the prime mover governor, thus making an automatic regulation practically impossible in such cases.

The present invention avoids the above difficulties in regulation of the load interchange between parallel connected power plants by regulating not one but at least two stations simultaneously so that the network frequency remains very nearly the same before and after the regulating action. The frequency and the total load in all of the connected networks as well as the load interchanged then remains unchanged in spite of the regulating operation.

For example, if station A is connected with station B as well as with other stations and the load interchanged from A to B is to be increased to 10,000 kw., the prime mover governor in station A is set for higher load and the governor for the prime mover in station B is set for the lower load. If the governors in both stations are the same in construction and operation, they are changed by the same amount but in opposite directions. Thus the governor in station A is so adjusted that, if the station were operating alone, a permanent frequency increase of 1% would be obtained and the governor in station B is so adjusted that, if the station were operating alone, a permanent frequency decrease of 1% would be obtained. In parallel operation, the frequency is thus kept constant both before and after the regulating action. If the governors in the two stations are not the same, adjustments are so made that the above results as respects frequency are also obtained. If the two stations are not of the same size, i. e. do not deliver the same amount of power, mere adjustment of the governors is not sufficient but the load relations must also be considered to maintain the same frequency. Thus instead of regulating only one of two parallel connected power stations, the regulation is divided up between the two in proportion to the station characteristics so that no frequency change results from the regulation.

The simultaneous regulation of several power stations may be carried out by several means such as the provision of a measuring instrument arranged to measure the load interchanged and to transmit the measurement to both stations in which devices will be so operated by the measurement as to cause proper adjustment of the governors. The governor operating devices may also be arranged at the point of connection of the two networks from which devices impulses may be sent to the governors instead of transmitting a load value measured as above. If the governor impulses transmitted to both stations are of equal lengths, care must be taken that the effects thereof are equal and in opposite directions, i. e. that the regulation per second amounts to the same load value. The speed of the motors for adjusting the governors must therefore be made dependent on the number and size of the prime movers in the stations as well as on their characteristics.

It is, therefore, among the objects of the present invention to provide a system for regulating the interchange of load between two or more parallel connected power stations.

Another object of the invention is to provide a system for regulating the interchange of load between two or more power stations in which a variation in regulation of the load interchange will not affect the total load supplied by the stations.

Another object of the invention is to provide a system for regulating the interchange of load between two or more parallel connected power stations in which the frequency of the network supplied by the several stations is maintained the same both before and after regulation of the load interchange.

Figure 2:
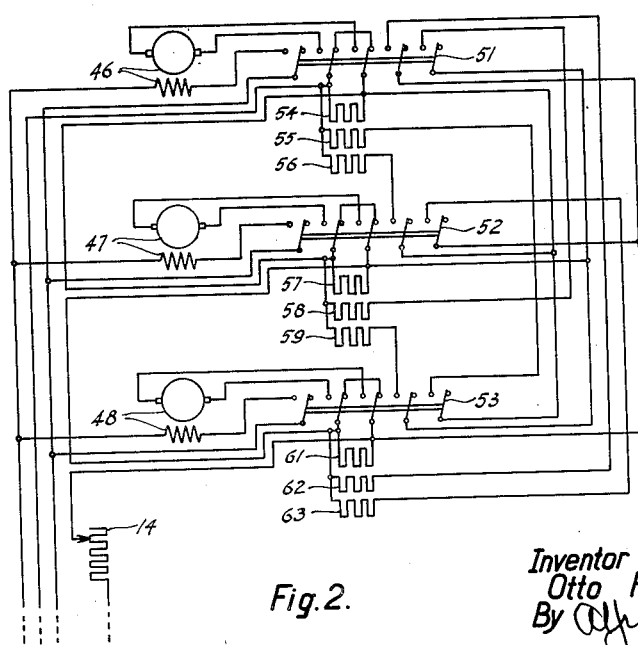

Objects and advantages, other than those above set forth, will be apparent from the following description when read in connection with the accompanying drawing in which Figure 1 diagrammatically illustrates one embodiment of the present invention showing several power stations each having a single generator with an interlocking control system which prevents interference of regulation of a third station with the two other stations, and Fig. 2 diagrammatically illustrates the connections of any one station having several generators and prime movers therein.

Referring more particularly to the drawing by characters of reference, the reference characters A, B and C designate different electric power stations which are located at separated points and are connected in parallel to supply power to the same electric line. The station A comprises a prime mover 6, here diagrammatically shown as being a steam turbine which is coupled with an electric generator 7 connected with and delivering electric power to a power line 8. The power line 8 has been indicated as divided into several sections of which two sections are designated as 8a and 8b for purposes of convenience in the description of operation of the system given hereinafter. The turbine 6 is controlled by a governor of the usual character (therefore not shown), the setting of which may be varied by a motor 9. The motor 9 is controlled by relays 11 and 12 which control the motor circuits in such manner that selective energization of the relays from a source of current 13 will cause rotation of the motor armature in different directions. An adjustable resistance 14 is connected in series with the armature of motor 9 for purposes which will appear hereinafter.

The station B is also equipped with a turbo-generator including the turbine 16 and the generator 17. The supply of steam to the turbine is regulated by a motor 19 which is operated in either direction upon selective energization of relays 21 and 22. An adjustable resistance 24 is connected in series with the armature of motor 19 for a purpose which will be set forth in the following. The station B likewise contains two relays 36 and 37, the purpose of which will be set forth hereinafter.

Station C is also equipped with a turbine 26 driving a generator 27 which delivers power to the line 8. The operation of the turbine is controlled by a motor 29 acting on the governor of the turbine. The motor is in turn controlled by a pair of relays 31 and 32 which are selectively energized from the source 13 as will be presently explained and which control the direction of rotation of the motor. An adjustable resistance 34 is connected in series with the armature of motor 29 as is the case with resistances 14 and 24 and the armature of motor 19 and 29 respectively. The resistances 14, 24 and 34 are all adjusted to the same value if the motors 9, 19 and 29 are all the same construction and operate in the same way on the governors of the turbines 6, 16 and 26 to produce the same power output therefrom. If the motors and their regulating action result in different power delivery from the turbines, the resistances are adjusted to compensate for such differences.

A current transformer 38 is connected into the line 8 at the section 8a between stations A and B and supplies current to a contact-making measuring instrument 39 and a current transformer 41 is connected into line 8 at the section 8b thereof between stations B and C and supplies current to a contact-making measuring instrument 42. The two instruments cooperate in controlling the application of the source 13 to the relays in the several stations as will be apparent from the operation of the system to be described.

Figure 2 illustrates the electric circuits required in a station when a plurality of generators driven by separate prime movers are used. Numerals 46, 47 and 48 designate the motors for adjusting the governors controlling the steam supply to the prime movers. A double-throw switch as at 51, 52 and 53 is arranged to change the connection of the circuits of the motors and to vary the connections of a plurality of resistances 54, 55 and 56; 57, 58 and 59; 61, 62 and 63. The circuits and the results obtained from the several circuits will readily be apparent from the description of operation of the system.

Assuming that the system is operating, i. e. that all stations A, B and C are delivering electric energy to line 8 to be used for loads connected to the line at different points thereof and that the power is being interchanged between the stations at a pre-determined rate, current will be flowing in line sections 8a and 8b. As the current is interchanged at the pre-determined rate, the contact-making pointer of both instruments 39 and 42 will be in the intermediate position shown and all of the relays will be de-energized. The motors 9, 19 and 29 will then remain at rest and the turbines 6, 16 and 26 will continue to operate at their previous speed.

If the amount of current flowing from A to B decreases due to additional loads connected with the line, instrument 39 will make contact and will complete a circuit with the source 13 to energize relays 12 and 36. Relay 12 will be raised to complete a circuit from source 13 to motor 9 which will be rotated in one direction to open the supply valves to turbine 6 farther and relay 36 will be raised to complete a circuit from source 13 to motor 29 which will be rotated in one direction to close the supply valves to turbine 16 farther. The valves of the turbines 6 and 16 are thus turned in opposite direction until the pre-determined interchange between the stations has been re-established. Variations of load interchange are thus obtained without change of the frequency of the current in the line 8. As soon as the predetermined interchange has been re-established, instrument 39 breaks the circuits to relays 12 and 36 and the motors 9 and 19 remain in the position reached which causes turbines 6 and 16 to produce sufficient power to maintain the newly set rate of interchange between the stations A and B.

It will be understood that resistances 14 and 24 are so adjusted that motors 9 and 19 rotate by an amount so determined that the total amount of power delivered by the two turbines remains the same. The relays 11 and 12, 21 and 22, 31 and 32 are capable of making connection between the motors 9, 19 and 29 such as to cause rotation thereof in both directions. For example, relay 12 will cause such rotation of motor 9 as will cause opening of the valves of turbine 6 and relay 11 will cause such rotation of motor 9 as will cause closing of the valves of turbine 6. Similar conditions and operations likewise obtain for the relays of the several other stations.

If the amount of current interchanged from station A to station B increases, the pointer of instrument 39 will rotate to such position as to contact with the other contact block thereof thereby completing circuits from source 13 which will permit energization of the coils of relays 11 and 37. The relays 11 and 37 will then be lifted thereby completing circuits from the current source 13 to the motors 9 and 19 which will rotate in such direction as to cause closing of the valves permitting the entrance of steam to the turbine 6 and to cause opening of the valves permitting entrance of steam to turbine 16. The motors will continue to rotate in their respective directions of motion until the predetermined interchange relations between the stations are re-established whereupon the current measured by the instrument 39 will be such as to permit the pointer thereof to return to the position shown in the drawing whereupon the circuits for relays 11 and 37 will be broken, the relays will drop and the circuits to the motors 9 and 19 will also be broken. Turbines 6 and 16 will then continue to operate at the re-established rate of interchange until the interchange load again varies.

If the current interchanged between stations B and C decreases, the pointer of measuring instrument 42 will be rotated to close circuits from source 13 such as will permit energization of relays 22 and 31. The relays will then close such circuits as will permit the flow of currents from source 13 to the motors 19 and 29. The motors will rotate in opposite direction and will cause opening of the valves of turbines 16 and closing of the valves of turbine 26 respectively. The opposing opening and closing action of the valves in the two stations will continue until the pre-determined interchange load has been re-established whereupon the pointer of instrument 42 will have returned to the intermediate position shown thereby breaking the circuits to the relays 22 and 31. If the current flowing from station B to station C increases, the pointer of the measuring instrument 42 will be so rotated as to complete circuits from the source 13 to the relays 21 and 32 which then being energized will cause such rotation of the motors 19 and 29 as to cause closing action of the valves of the turbine 16 and opening action on the valves of the turbine 26 respectively. Such opposing action of the motors will continue until the pre-determined load interchange between stations B and C has been re-established whereupon the pointer of instrument 42 will return to the position shown in the drawing and all of the circuits will be interrupted.

If the current flowing from station A to station B and from station B to station C decreases, measuring instrument 39 will be so energized as to cause the pointer thereof to make contact thereby completing circuits to the relays 12 and 36 which will complete circuits to motors 9 and 19 causing rotation thereof in such direction as to open the valves of turbine 6 and to close the valves of turbine 16. The pointer of instrument 42 would likewise be caused to rotate in such direction as to cause energization of relays 22 and 31 except for the fact that the circuits to such relays has been interrupted by the contacts of relay 36 which is lifted in response to the action of more than two stations at one time thereby preventing interference which would be likely to result otherwise. The pre-determined interchange of current between stations B and C can thus be re-established only after the load interchange between stations A and B has already been re-established. If the current increases in line section 8a connecting stations A and B and line section 8b connecting stations B and C, the measuring instrument 39 will cause energization of relays 11 and 37 which will close circuits to supply current to motors 9 and 19 which will tend to cause closing of the valve of turbine 6 and opening of the valve of turbine 16 respectively. Measuring instrument 42 will also be energized in such manner that its pointer will tend to complete circuits from the source 13 to the relays 21 and 32, but due to the fact that such circuits have already been interrupted by the lifting of relay 37, the interchange load variation between stations B and C can be adjusted to its previous value only after such relations between stations A and B have been re-established.

When two or more prime movers and generators are arranged in a single station as shown in Fig. 2 the switches 51, 52 and 53 are placed in the position shown when automatic regulation of the relations between the several generating units is not desired. Each switch then opens the armature and field circuits of its associated motor, which armatures are all operated in series. Change of position of any one switch closes the circuit of the armature and field windings of the corresponding motor which is then caused to operate while the remaining motors are kept out of operation. The resistances shown in groups of three are arranged to be connected in parallel with the respective motors, being so combined that regulation of each motor is forced to correspond with the operation of the motor for any other prime mover in the station. As an example, if switches 51 and 52 are reversed from the position shown in the drawing, the fields of motors 46 and 47 will be connected in parallel and the armatures of the motors 46 and 47 will be connected in series with the adjustable resistance 14 which now controls all three of the motors in the station. The circuit of the armature of motor 48 is opened and the armature of motor 46 is placed in parallel with resistances 54 and 55 while the armature of motor 47 is placed in parallel with resistances 57 and 58. All of the other resistances are out of circuit with either the fields or the armatures of any of the motors. The motors 46 and 47 then change the combined output of their generators at the same rate as motor 46 would change the output of its own generator if operating alone.

It will thus be seen that the present invention provides a system for regulating the interchange of electric current between two or more parallel connected power stations in such manner that regulation of the interchanged current does not vary the total load on the network and does not vary the frequency of the current flowing therein. It is immaterial to the present invention whether or not the system is applied to a plurality of power stations each containing only a single current generator or whether the invention is applied to a plurality of power stations each containing a plurality of generators or is applied to a plurality of power stations some of which contain a single generator while others connected to the same network contain a plurality of generators.

Although but one embodiment of the present invention has been illustrated and described, it will be apparent to those skilled in the art that various changes and modifications may be made therein without departing from the spirit of the invention or from the scope of the appended claims.

The invention claimed is:

1. In a system for regulating the interchange of electric current between separated power producing stations, a power distributing line, a plurality of separated power stations each comprising an electric generator to deliver current to said line, a prime mover driving said generator, an electric motor operable in either direction of rotation to control the operation of said prime mover, and a plurality of relays controlling the direction of rotation of said motor, said relays causing rotation of said motors in different directions in different ones of the stations simultaneously, a source of electric current for energizing said motors and said relays, and means for selectively energizing said relays in response to current conditions in said line, said relays permitting operation of said motors in only two of the stations simultaneously.

2. In a system for regulating the interchange of electric current between separated power producing stations, a power distributing line, a plurality of separated power stations each comprising an electric generator to deliver current to said line, a prime mover driving said generator, an electric motor operable in either direction of rotation to control the operation of said prime mover, and a plurality of relays controlling the direction of rotation of said motor, said relays causing rotation of said motor in different directions in different ones of the stations simultaneously by such amount as to maintain a substantially constant frequency in said line, a source of electric current for energizing said motors and said relays, and means for selectively energizing said relays in response to current conditions in said line, said relays permitting operation of said motors in only two of the stations simultaneously to maintain the quantity of power delivered by such stations at a constant value relative to the value prior to regulating action of said motors.

3. In a system for regulating the interchange of electric current between separated power producing stations, a power distributing line, a plurality of separated power stations each comprising an electric generator to deliver current to said line, a prime mover driving said generator, an electric motor operable in either direction of rotation to control the operation of said prime mover, and a plurality of relays controlling the direction of rotation of said motor, said relays causing rotation of said motors in different directions in different ones of the stations simultaneously, the rate and amount of rotation of said motors being the same upon operation of said relays, a source of electric current for energizing said motors and said relays, and means for selectively energizing said relays in response to the current conditions in said line, said relays forming an interlocking system to permit energization of said motors in only two of the stations from one of said instruments.

4. In an electrical distribution system, a load circuit, a plurality of electric generators connected with said circuit to supply energy thereto, a fluid operated prime mover for driving each generator and forming a unit therewith, a regulator for each of said units operable to control the supply of operating fluid to the prime mover thereof, and means connected with said circuit and operable responsive to flow of current therein for simultaneously controlling the operations of two of said regulators to thereby cause the supply of operating fluid to the prime mover of one of said units to be increased and the supply of operating fluid to the prime mover of another of said units to be decreased.

5. In an electrical distribution system, a load circuit, a plurality of separated power stations each comprising an electric generator connected with said circuit to supply energy thereto, a fluid operated prime mover for driving each of said generators and forming a unit therewith, a regulator for each of said units operable to control the supply of operating fluid to the prime mover thereof, and means connected with said circuit at a point therein between two of said stations actuated responsive to and in dependence upon the magnitude of the flow of current in said circuit at said point operable to cause actuation of one of said regulators to thereby cause the supply of operating fluid to the prime mover of one of said units to be increased and operable to cause actuation of another of said regulators to thereby cause the supply of operating fluid to the prime mover of another of said units to be simultaneously decreased.

6. In an electrical distribution system, a load circuit, a plurality of separated power stations each comprising an electric generator connected with said circuit and operable to supply energy thereto, a fluid operated prime mover for driving each of said generators and forming a unit therewith, a regulator for each of said units operable to control the supply of operating fluid to the prime mover thereof, and relay means connected with said circuit at a point therein between two of said stations actuated in one and another sense responsive to and in dependence upon the magnitude of the flow of current in said circuit at said point operable to cause actuation of one of said regulators to thereby cause the supply of operating fluid to the prime mover of one of said units to be increased and operable to cause actuation of another of said regulators to thereby cause the supply of operating fluid to the prime mover of another of said units to be simultaneously decreased.

7. In an electrical distribution system, a load circuit, a plurality of separated power stations each comprising an electric generator connected with said circuit and operable to supply energy thereto, a fluid operated prime mover for driving each of said generators and forming a unit therewith, a regulator for each of said prime movers comprising a motor operable in one sense to cause the supply of operating fluid to the associated prime mover to be increased and operable in another sense to cause the supply of operating fluid to the associated prime mover to be decreased, a source of current for operating said motors, a plurality of relays associated with each of said motors and selectively actuated to effect the connection of said source of current with the associated one of said motors to cause operation thereof in the said one and another sense in dependence upon the selective actuations of said relays, and means connected with said circuit at a point therein between two of said stations operable in one sense responsive to and in dependence upon the flow of current in said circuit at said point above a predetermined value to cause actuation of one of said plurality of relays associated with one of said motors to cause actuation thereof in the said one sense and to cause actuation of one of said plurality of relays associated with another of said motors to cause actuation thereof in the said another sense, the said means being operable in another sense responsive to and in dependence upon the flow of current in said circuit at said point below a predetermined value to cause actuation of another of said plurality of relays associated with the said one of said motors to cause actuation thereof in the said another sense and to cause actuation of another of said relays associated with the said another of said motors to cause actuation thereof in the said one sense.

8. In an electrical distribution system, a load circuit, a plurality of electric current generators connected with said circuit to supply energy thereto, a regulator associated with each said generator and operable to control the energy output thereof, and means connected with said circuit and operable responsive to flow of current therein for simultaneously controlling the operations of two of said regulators to thereby cause the energy output of one of said generators to be increased and the energy output of another of said generators to be decreased.

9. In an electric distribution system, a load circuit, a plurality of separated power stations each comprising an electric current generator connected with said circuit to supply energy thereto, a regulator associated with each said generator and operable to control the energy output thereof, and means connected with said circuit at a point therein between the point of connection of two of said generators with said circuit and actuated responsive to and in dependence upon the magnitude of the current flow in said circuit at said point to cause the operation of one of said regulators to thereby cause the energy output of the associated one of said two of said generators to be increased and to simultaneously cause the operation of another of said regulators to thereby cause the energy output of the associated one of the other of said two of said generators to be decreased.

OTTO PLECHL.